US006696654B2

(12) United States Patent
Ashani et al.

(10) Patent No.: US 6,696,654 B2
(45) Date of Patent: Feb. 24, 2004

(54) DESIGN SYSTEM OF SECONDARY ISOLATING CONTACTS IN CIRCUIT BREAKERS

(75) Inventors: Nitin Keshavlal Ashani, Thane (IN); Deepak Mehra, Mumbai (IN)

(73) Assignee: Larsen & Toubro Limited, Maharashtra (IN)

( * ) Notice: Subject to any disclaimer, the term of this patent is extended or adjusted under 35 U.S.C. 154(b) by 0 days.

(21) Appl. No.: 10/090,108

(22) Filed: Mar. 4, 2002

(65) Prior Publication Data

US 2003/0168327 A1 Sep. 11, 2003

(30) Foreign Application Priority Data

Aug. 14, 2001 (IN) .................................. 817/MUM/2001

(51) Int. Cl.[7] ............................ H02B 1/26; H01H 9/00

(52) U.S. Cl. ...................... 200/307; 200/50.27; 439/7.6

(58) Field of Search ................................ 200/293, 307, 200/50.21–50.27; 361/605–615; 439/715, 716

(56) References Cited

U.S. PATENT DOCUMENTS

| | | | | | |
|---|---|---|---|---|---|
| 4,954,798 | A | * | 9/1990 | Kasahara et al. | 335/161 |
| 6,444,931 | B1 | * | 9/2002 | Bartek et al. | 200/307 |
| 6,459,054 | B1 | * | 10/2002 | Rowe et al. | 200/50.27 |

* cited by examiner

*Primary Examiner*—Michael Friedhofer
(74) *Attorney, Agent, or Firm*—Notaro & Michalos P.C.

(57) ABSTRACT

A novel unipolar design of Secondary Isolating Contacts for Circuit Breakers which provides flexibility to build schematic logistics by exploiting programmability of the design and which is flexible for subsequent addition or deletion or replacement of SICs with minimum efforts.

1 Claim, 10 Drawing Sheets

DESIGN SYSTEM OF SECONDARY ISOLATING CONTACTS IN CIRCUIT BREAKERS

TECHNICAL FIELD OF THIS INVENTION

This invention relates to a novel design of secondary isolating contacts in circuit breakers. This invention is aimed at achieving high modularity so that various accessories provided in the circuit breaker can be easily added and/or replaced.

BACKGROUND ART

Circuit breakers for low voltage generally find application in the current range of upto 6400A. These circuit breakers are available in Fixed & Drawout versions. Drawout version facilitates easy maintenance and installation.

For drawout circuit breaker, a chamber like unit often called as Cradle is generally additionally required, through which current carrying parts of the circuit breaker get connected in sliding and/or plug-in way. Power circuit, which handles current as per the ampere rating of circuit breaker (<=6400 Amp), has one arrangement, while various accessories viz. Closing release, shunt release, electrical charging device, auxiliary switch etc. which form part of control circuit have an independent arrangement. The current of control circuits is of the order of 10 Amperes.

The arrangement of control circuit has to be suitable for as many accessories as are present in modem day circuit breakers. The number varies from about twenties to about sixties.

Drawout circuit breaker can assume three different situations:

1. "Service" position; where Power as well as control circuit is connected. This is the position when circuit breaker is in operation.
2. "Test" position; where Power circuit is disconnected but control circuit is connected. In this position, the circuit breaker can be tested for proper functioning without switching and/or carrying power.
3. "Isolated" position; when control circuit is also disconnected.

Electrical micro switches are generally mounted in the cradle which sense the position of circuit breaker in cradle.

The arrangement for control circuit is required in line with the accessories chosen by different users and hence needs to be independently modular.

Many a time, because of process interlocking requirements, few control circuits need to be connected only in service and/or test position.

Presently available designs generally meet only basic requirement of circuit breaker, but these designs do not meet the modularity and circuit breaker position sensing and process interlocking needs.

Our design system effectively meets all these requirements in unique way.

DISCLOSURE OF THE INVENTION

Our design system of the present invention of contacts for connected of control circuit is called secondary isolating contacts (abbreviated as SICs). The basic module consists of the minimum possible i.e. ONE. Hence as less as one SIC can be provided in our circuit breaker. This design is thus called a unipolar design.

One SIC consists of one breaker SIC and one cradle SIC. The breaker SIC slides over the cradle SIC thus providing the desired connection.

In circuit breaker, many accessories are added by the user at a later date. In our design, when such an accessory is added, the corresponding SIC(s) can be added without disturbing the previously present SIC(s).

Similarly, when any accessory needs replacement, the corresponding breaker SIC(s) can be withdrawn without disturbing other SICs.

The cradle SICs design is such that it provides contact in Service+Test+Isolated position or any one position or combination of any two or all three positions, as desired.

DRAWINGS

The invention will now be described with the help of drawings. The drawings are duly marked with appropriate numerals for convenient reference. The drawings are not to scale. The drawings are non-restrictive examples. Drawings consist 10 figures.

DESCRIPTION OF THE PREFERRED EMBODIMENT

Referring to all the figures, in FIG. (1), four designs of conducting strip of Cradle SICs are explained: All position design (1*a*), only Isolated Position design (1*b*), only Test position design (1*c*), only Service position design (1*d*).

Figure 1A:
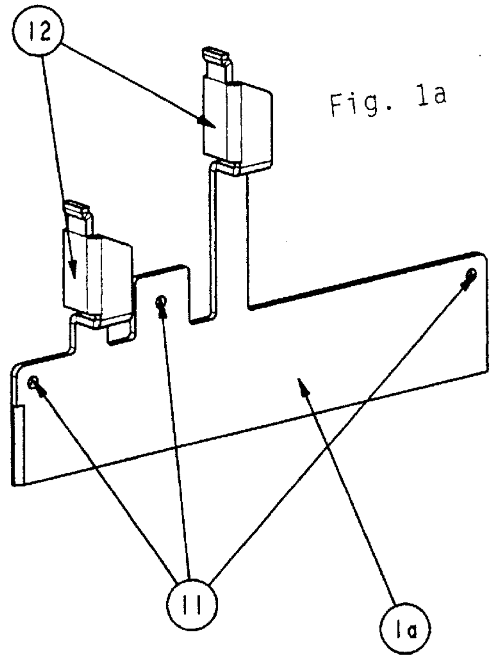
FIGS. 1*a*, 1*b*, 1*c* & 1*d*; show four different varieties of Cradle SICs contacts.
Figure 1B:
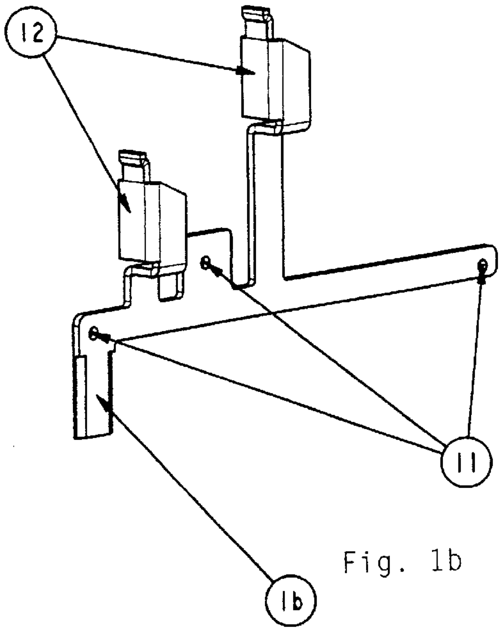
Figure 1C:
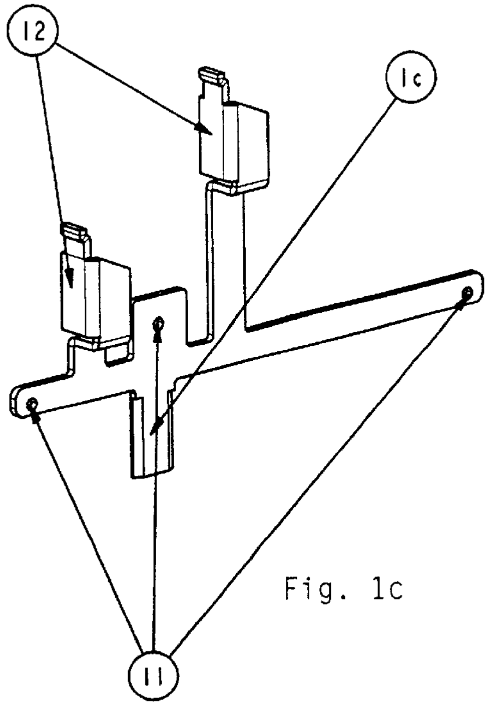
Figure 1D:
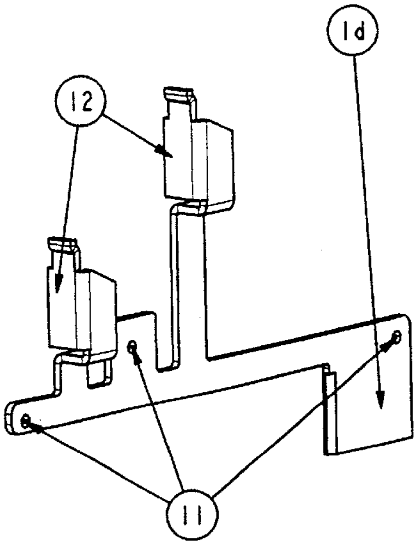
Figure 2A:
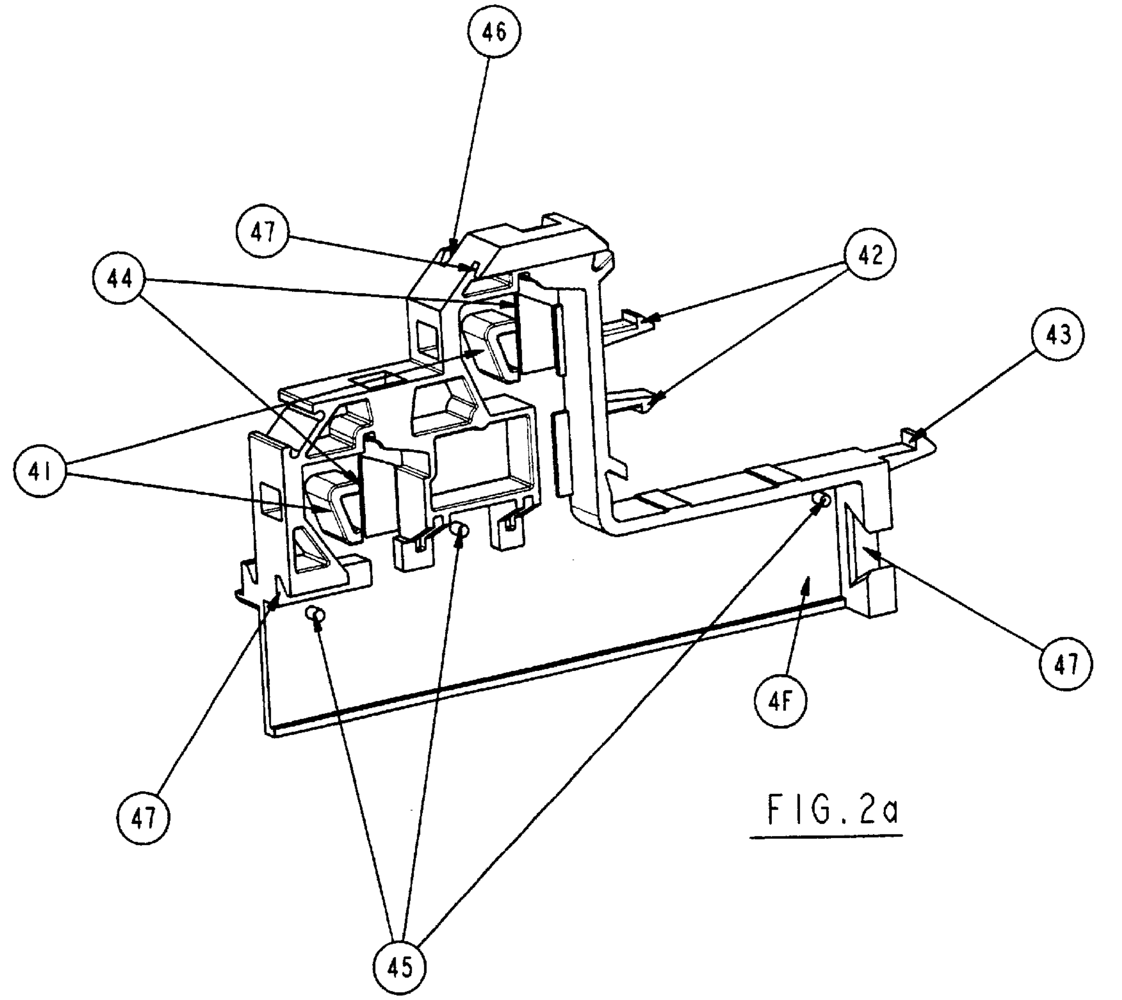
FIGS. 2*a* & 2*b*; show details of Cradle SIC insulated housing.
Figure 2B:
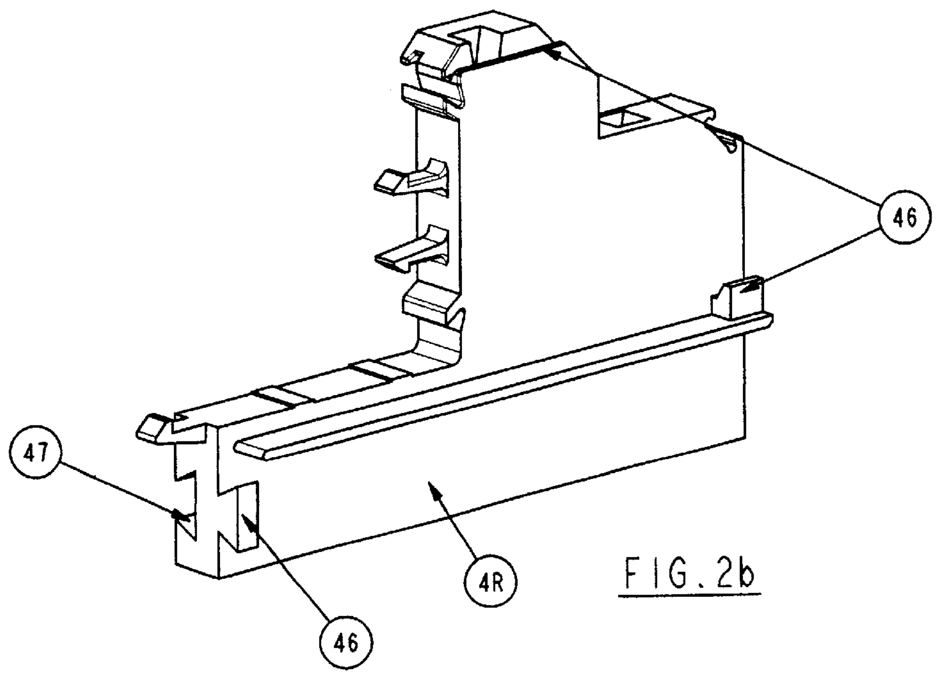

Referring to FIGS. 2*a* & 2*b*, cradle SICs insulated housing (4) is designed such that front and rear side/s of it (4*f* & 4*r*) have plurality of dovetail constructions (47 & 46) with the help of which two insulated housings can be clubbed together without using fastener. NOTE:—Even though the dovetail connections (46, 47) are in plurality, for the sake of simplicity in explaining the description, we have given only one number (46 or 47), and we have not mentioned as (46.1, 46.2, 46.3, . . . ; 47.1, 47.2, 47.3, . . . ). Such nomenclature is also followed in rest of the description.

Figure 3:
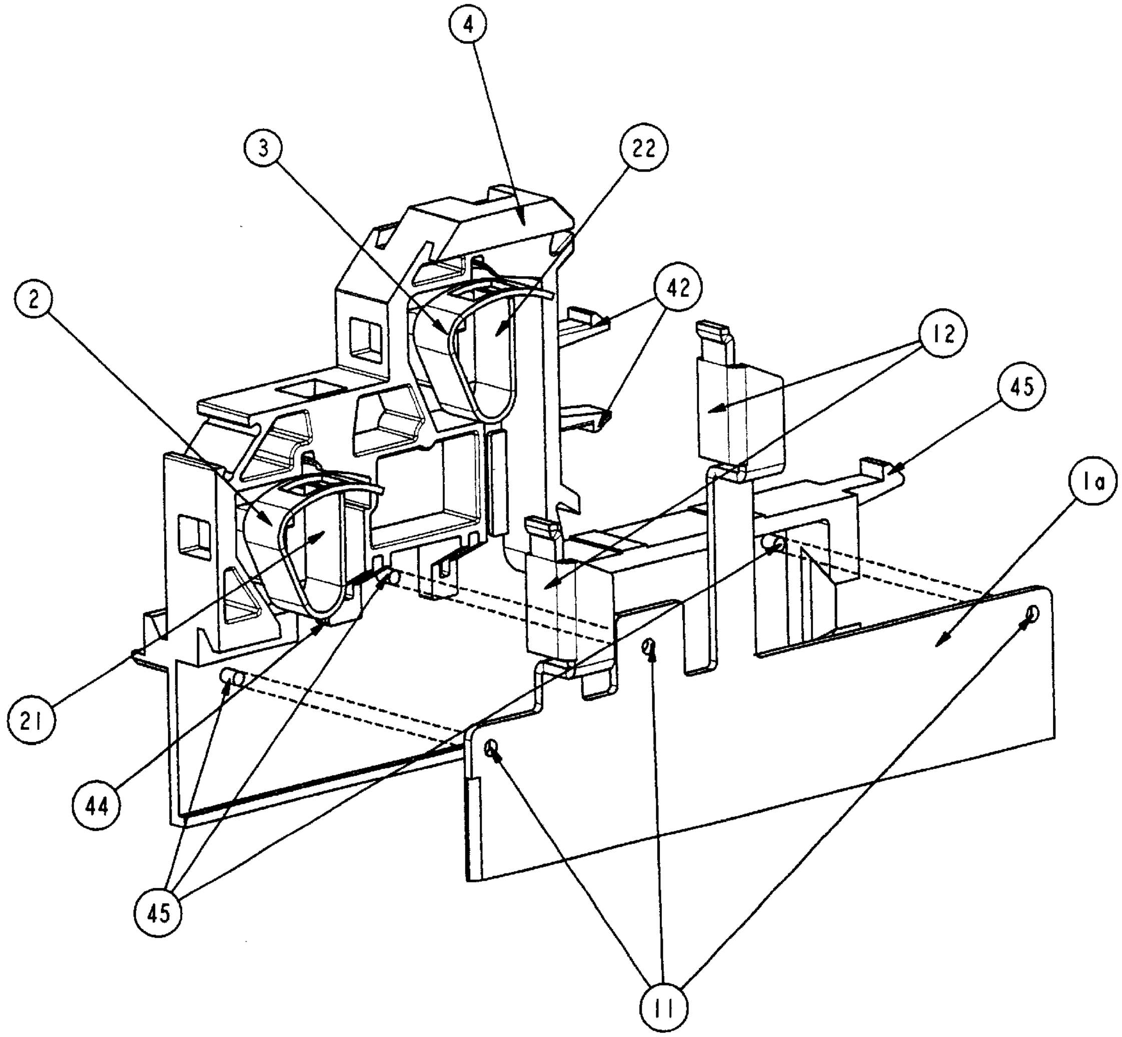
FIG. 3 shows assembly of conducting strip and Cradle SIC insulated housing.
Figure 4:
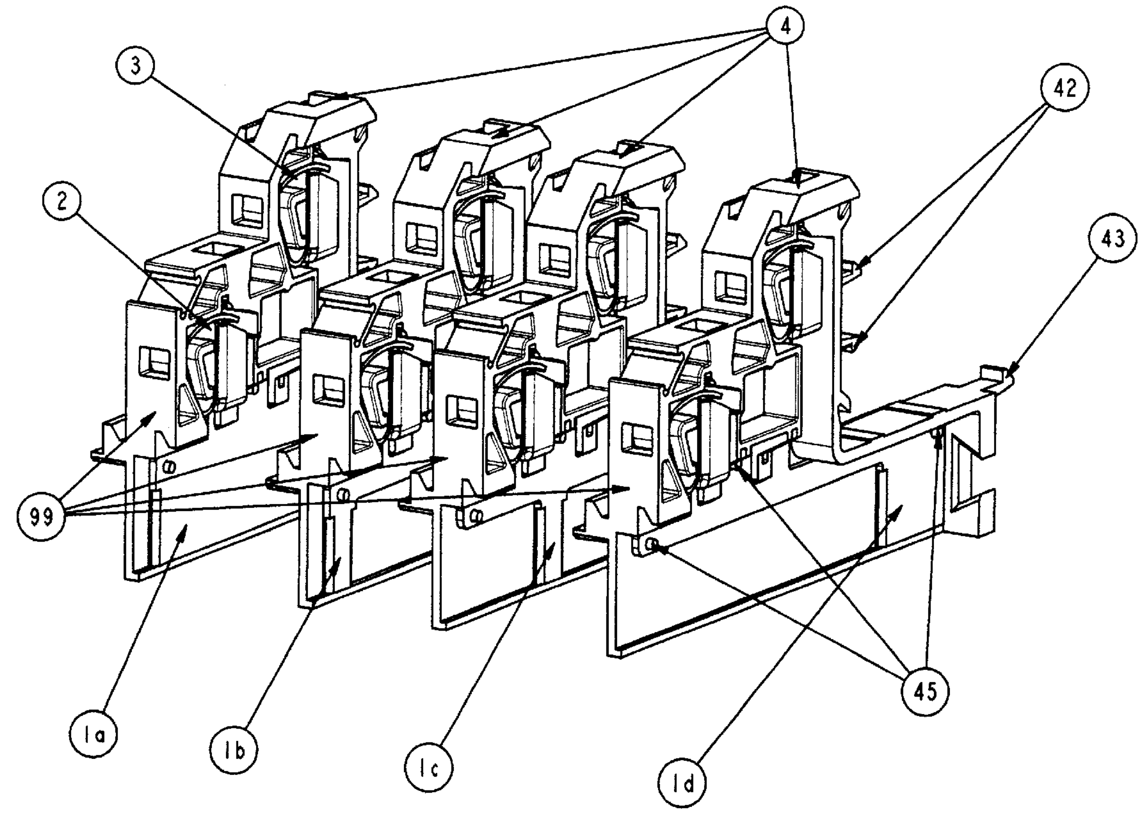
FIG. 4 shows stack of cradle SICs.
Figure 5A:
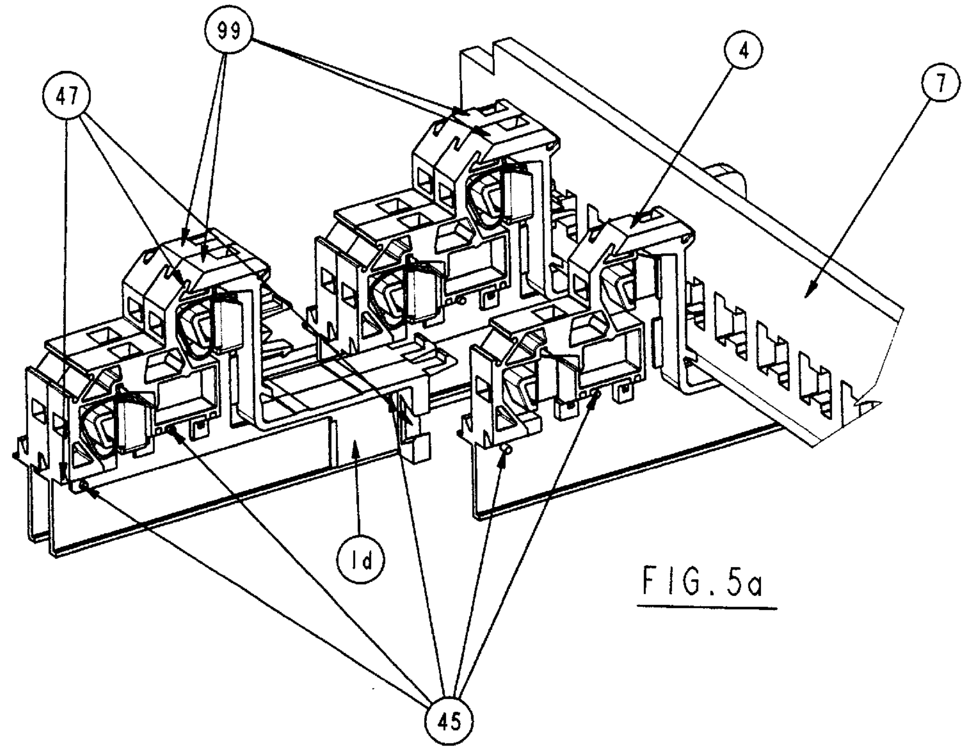
FIGS. 5*a* & 5*b*; show fixation details of cradle SIC and cradle SIC mounting member.
Figure 5B:
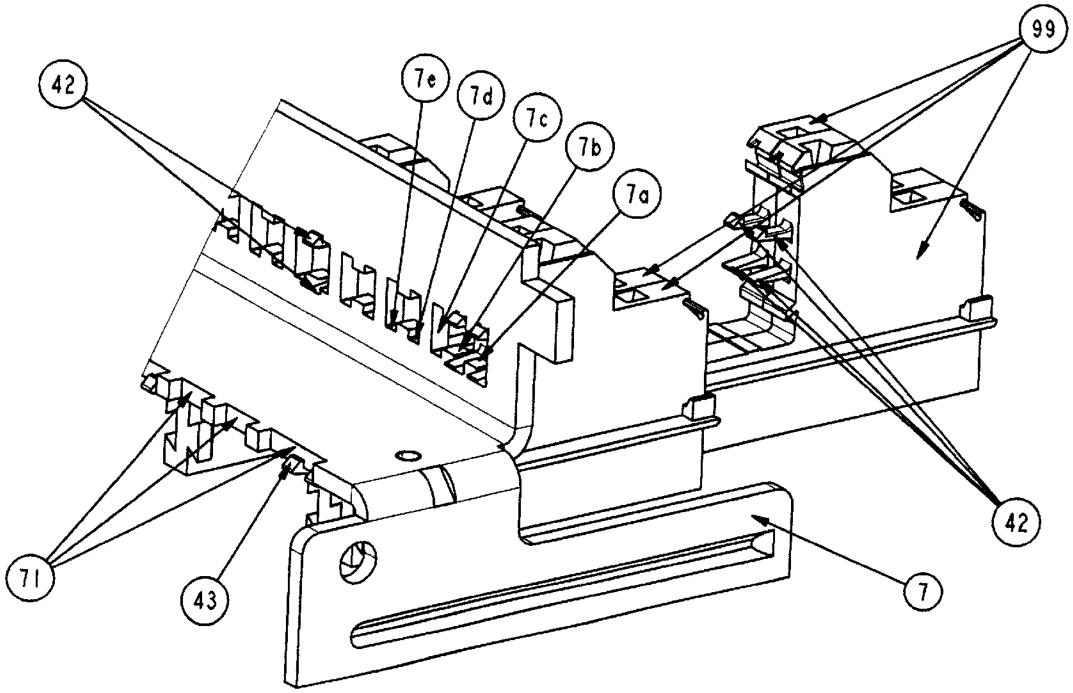
Figure 6A:
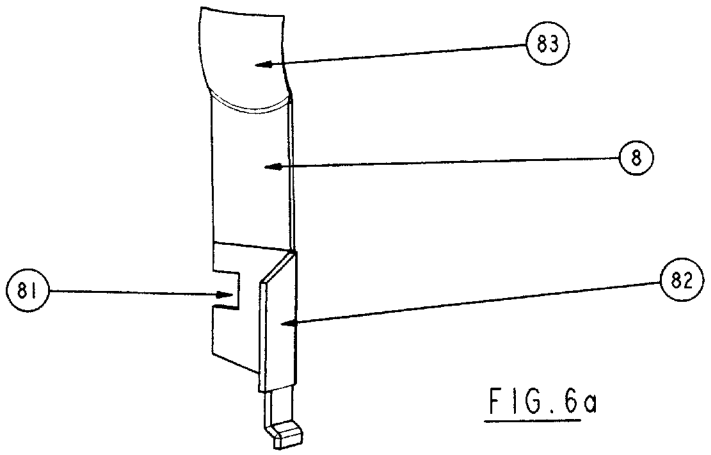
FIGS. 6*a*, 6*b* & 6*c*; show details of Breaker conducting contact & Breaker insulated housing.
Figure 6B:
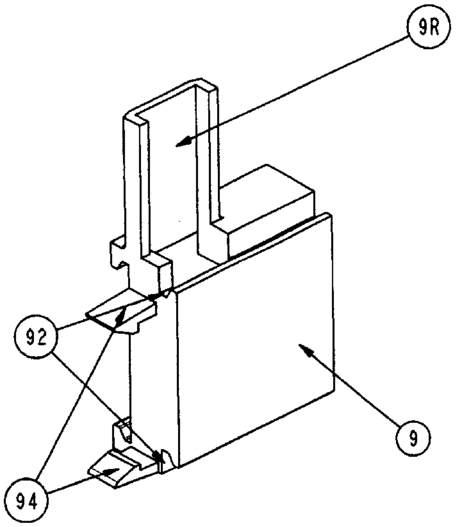
Figure 6C:
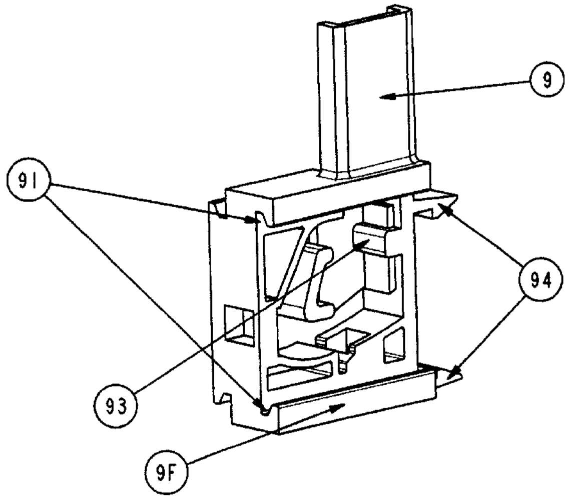
Figure 7A:
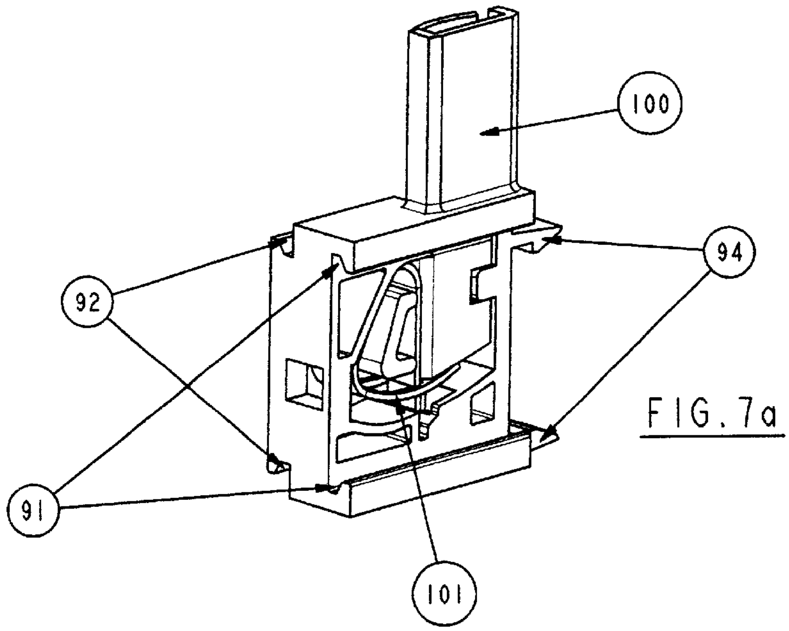
FIGS. 7*a* & 7*b*; show fixation details of conducting contact & Breaker SIC insulated housing.
Figure 7B:
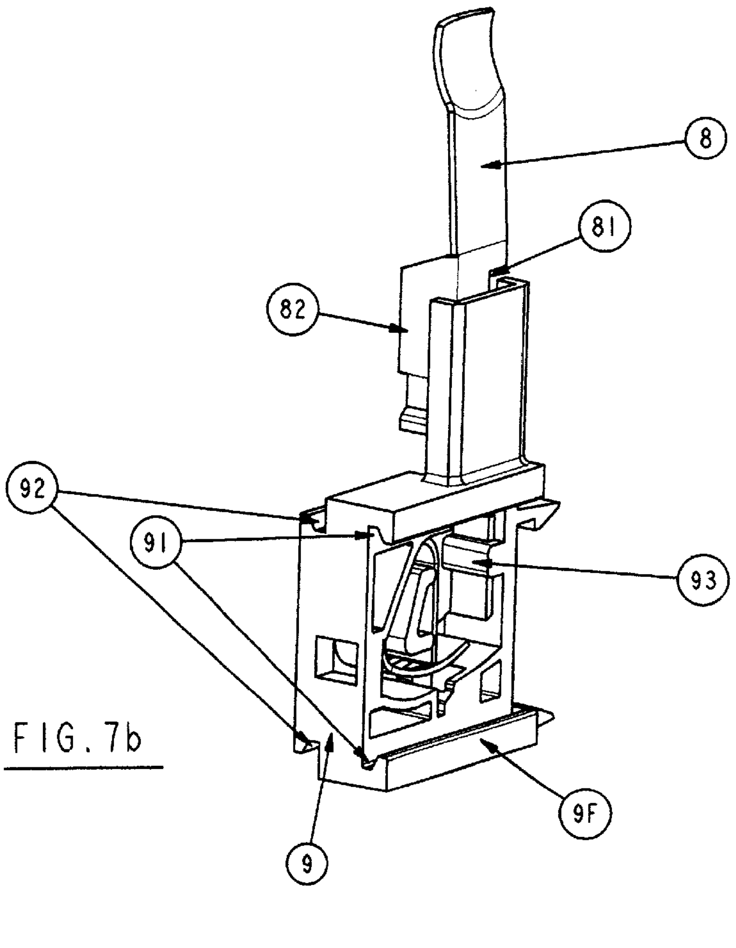
Figure 8:
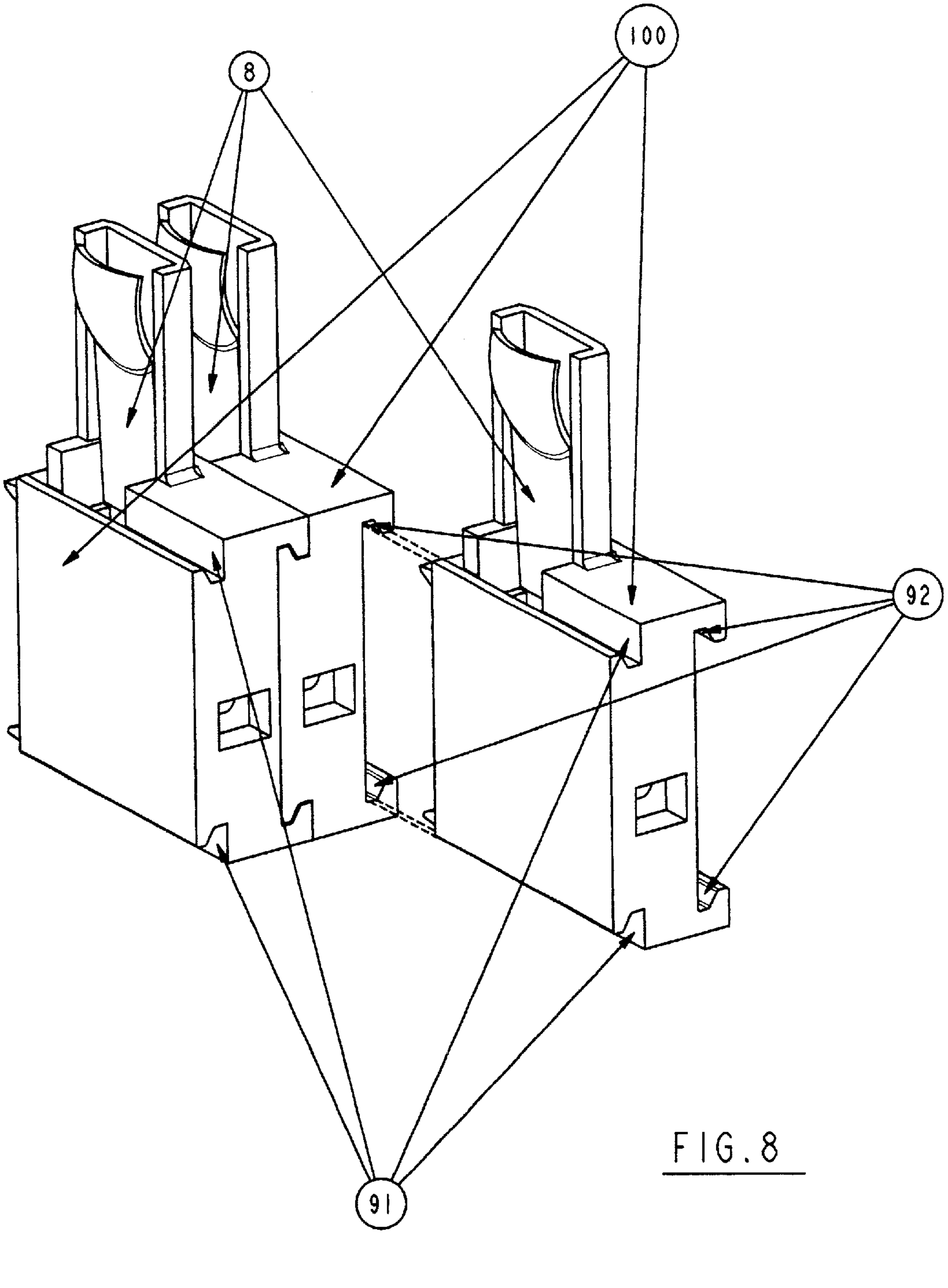
FIG. 8 shows stack of Breaker SICs.
Figure 10:
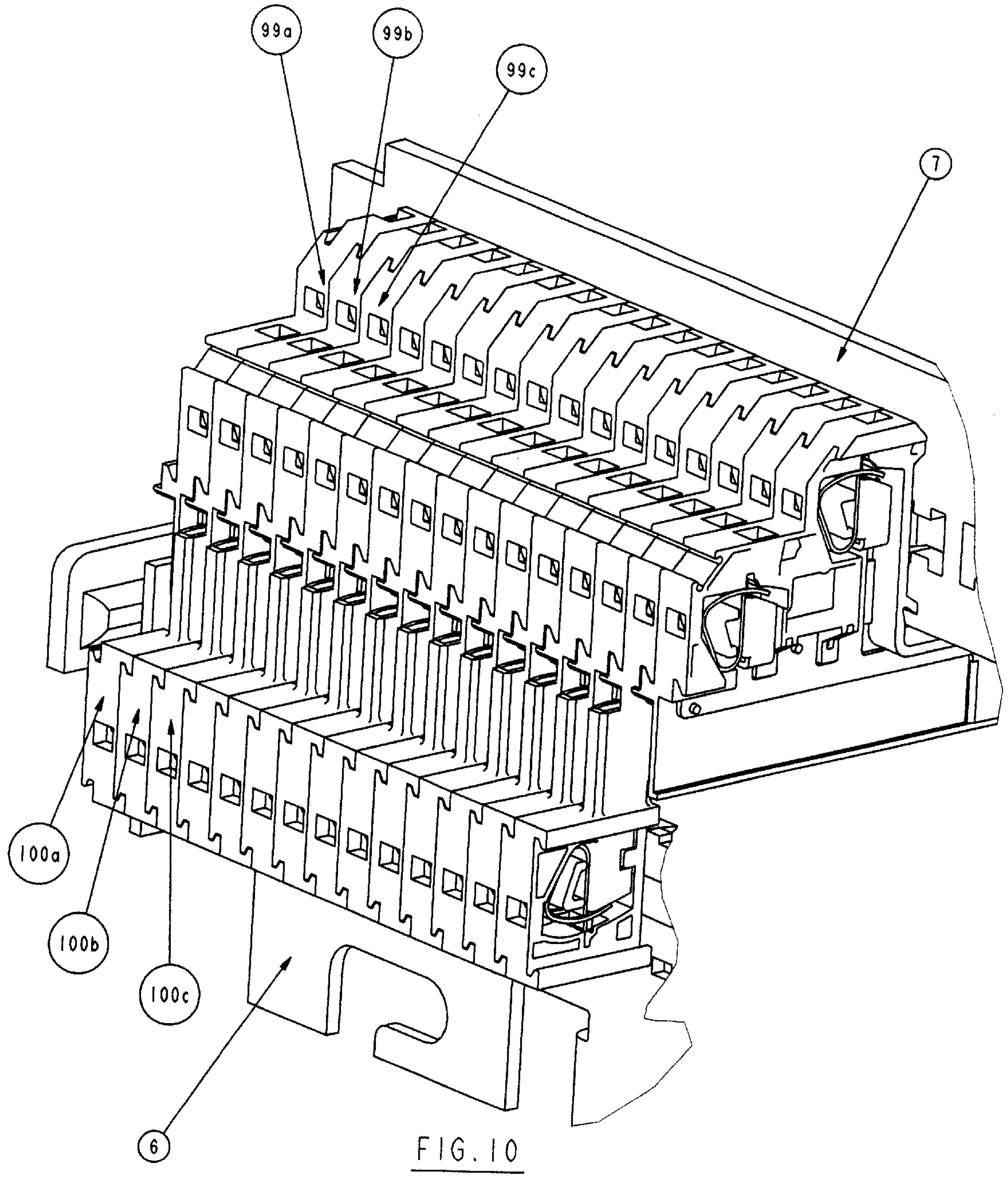
FIG. 10 shows a complete SIC.

Referring to FIGS. 2*a*, 2*b* & 3, wire terminals (2 & 3) are fitted on projection (41) in insulated housing (4). Plurality of holes (11) provided on copper strips (1*a*, 1*b*, 1*c* & 1*d*) fit into corresponding plurality of pips (45) on insulated housing (4) and specially constructed plurality of surfaces (12) of it trap between surfaces (21 & 22) of wire terminals (2 & 3) and wall construction (44) of insulated housing. This assembly thus obtained in FIG. 3 is identified as "Cradle SIC". "Cradle SIC" assembly/s (99*a* or 99*b* or 99*c* . . . ) is shown in FIGS. 5*a*, 5*b* & 10. Likewise many cradle SICs (99*a* or 99*b* or 99*c* or any combination thereof) can be clubbed together to get desired number of contacts.

Referring to FIGS. 5*a*, 5*b*, 10, Cradle SICs (99*a*, 99*b*, 99*c*) by virtue of their projection construction (42) are directly fixable on Cradle SIC mounting member (7) which in turn sits firmly on Cradle of circuit breaker. Cradle SICs get trapped at locations (7*a*, 7*b*, 7*c* . . . , 7*n*). Projection/s (43) traps against surface (71) of Cradle SIC mounting member (7). A Cradle SIC insulated housing (4) encloses last SIC conducting strip to prevent the probable electrically live part from the danger of exposure.

For completion of electrical circuit, every Cradle SIC (99) has corresponding Breaker SIC 100) as shown in FIG. 10, and explained in FIGS. 7*a*, 8, 9*a*, 9*b*. Breaker SIC insulated housing (9) has plurality of dovetail constructions (91 & 92) on its front and rear side (9*f* & 9*r*). Hence two or more breaker insulated housings (9) can be clubbed together.

Figure 9A:
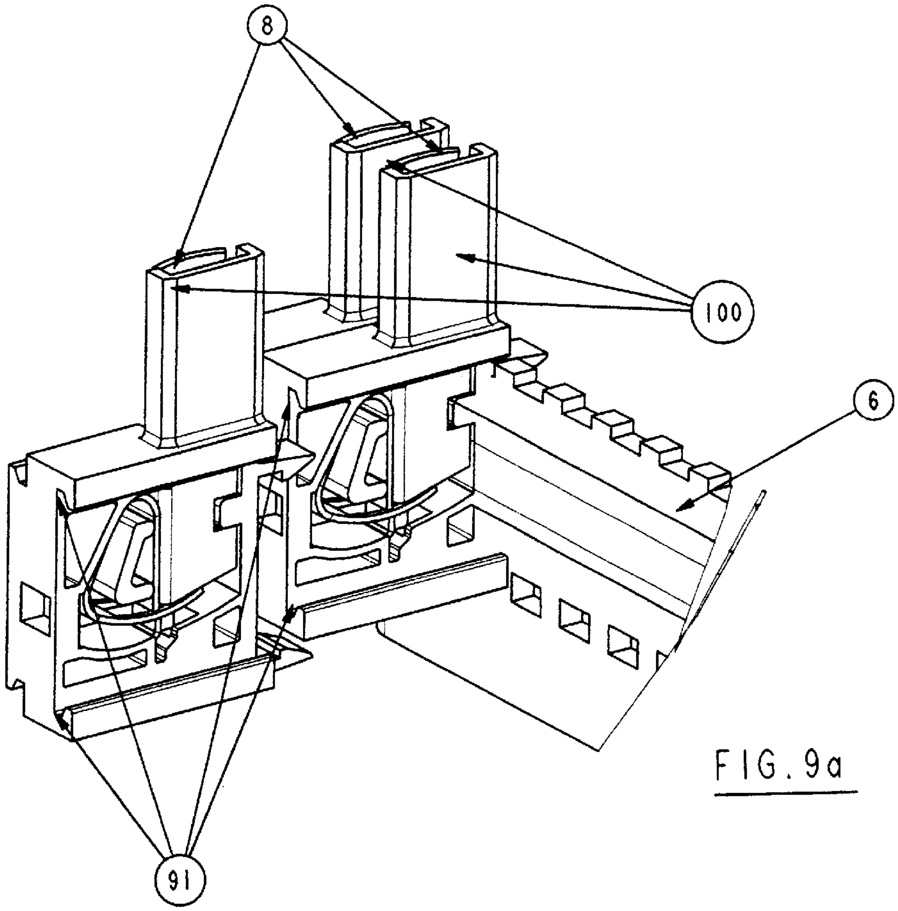
FIGS. 9*a* & 9*b*; show fixation details of Breaker SIC & Breaker SIC mounting member.
Figure 9B:
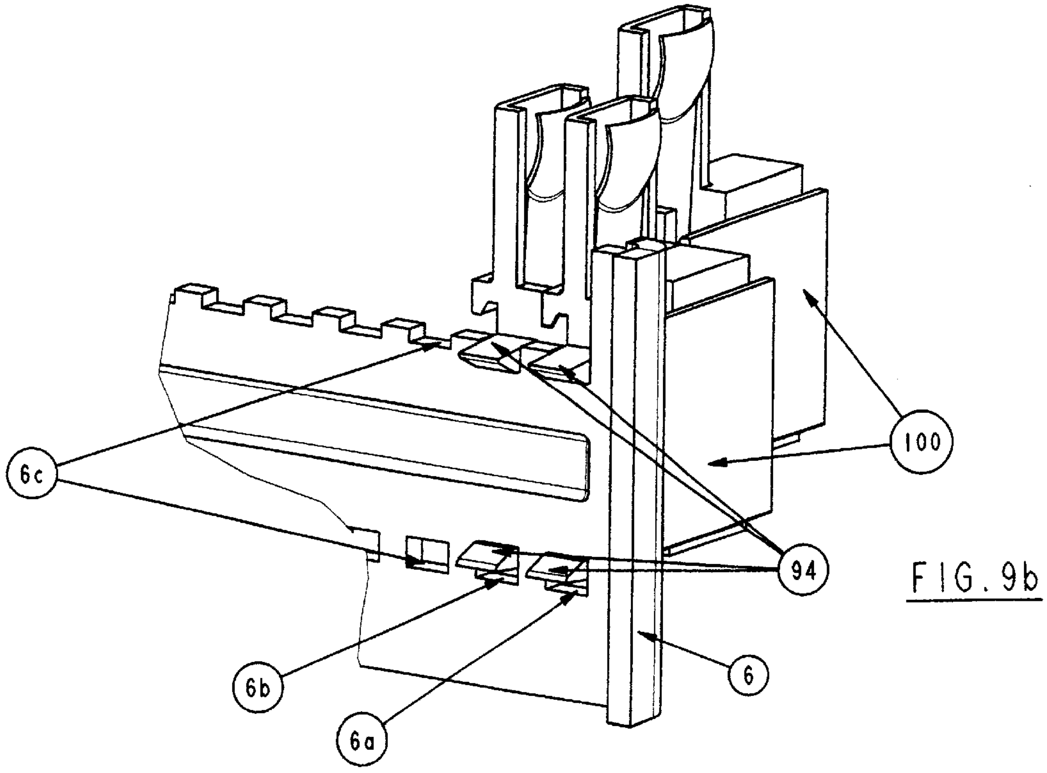

Referring to FIGS. 6*a*, 6*b*, 6*c*, 7*a*, slot (81) in conducting contact (8) fits on corresponding profile (93) in breaker moulded housing (9). Wall (82) of conducting contact (8) rests against wire terminal (101). This assembly is identified as "Breaker SIC" (100). A number of Breaker SICs can be clubbed together to get desired number of contacts, as shown in FIG. 10. With the help of projection construction (94), Breaker SICs are directly fixable on Breaker SIC mounting member (6); at locations (6*a*, 6*b*, 6*c* . . . , 6*n*) as shown in FIGS. 9*a*, 9*b*, 10.

When an air circuit breaker is in ISOLATED position, assembly (99) with Isolated position Cradle SICs design (1*b*) comes in contact with Breaker SIC (100*a*, 100*b*, 100*c* . . . ,) i.e. surface (83) of Breaker SIC copper contact (8). Likewise many breaker SICs (100*a* or 100*b* or 100*c* or any combination thereof) can be clubbed together to get desired number of contacts.

Similarly when air circuit breaker is in TEST position, assembly (99) with Test position Cradle SICs design (1*c*) makes contact with surface (83). Likewise, in SERVICE position, service position Cradle SICs design (1*d*) makes contact with surface (83). All position Cradle SICs design (1*a*) remains connected throughout the travel of breaker i.e. from ISOLATED to SERVICE position.

As shown in FIG. 10, this design of SICs provides continuity between breaker SICs (100*a*, 100*b*, 100*c*) and Cradle SICs (99*a*, 99*b*, 99*c*) by sliding action. The breaker SICs (100*a*, 100*b*, 100*c*) conducting contact/s slide/s on the conducting strip/s of Cradle SICs (99*a*, 99*b*, 99*c*).

By virtue of possibility of these arrangements, aptly called programming, control wiring scheme can be designed with high flexibility using any or all arrangements (i.e. programs)

VARIATIONS

More combinations viz. Test+Service, Test+Isolated and the like can be derived from this concept as variations.

What is claimed is:

1. A drawout circuit breaker connected to a primary power supply and a secondary power supply for operating functional accessories, the drawout circuit breaker having a unipolar system of secondary isolating contacts connecting with the secondary power supply and having a continuity of service position, a test position and an isolated position, or any combination thereof, and the system permitting subsequent insertion, removal or replacement of some of the secondary isolating contacts without disturbing other of the secondary isolating contacts, the circuit breaker comprising:

- a circuit breaker cradle having a cradle mounting member supporting at least one of the secondary isolating contacts, each of the secondary isolating contacts, comprising a cradle secondary isolating contact and a corresponding breaker secondary isolating contact connected in sliding relation with each other;
- each of the cradle secondary isolating contacts comprising:
  - a cradle insulated housing having front and rear sides with dovetail constructions for slidably connecting a plurality of cradle insulated housings together independently of each other;
  - cradle wire terminals fitted on projections in the cradle insulated housing; and
  - a conducting copper strip in electrical contact with the cradle wire terminals in the cradle insulated housing, the conducting copper strip having a plurality of holes therethrough mounted on a corresponding plurality of pips of the insulated housing, and having a conducting strip design which is ne of an isolated position design, a test position design, a service position design and combinations thereof;
- each of the corresponding breaker secondary isolating contacts comprising:
  - a breaker insulated housing with dovetail constructions on front and rear sides of the breaker insulated housing for slidably joining together a plurality of the breaker insulated housings independently of each other;
  - a breaker wire terminal supported in the breaker insulated housing; and
  - a conducting contact mounted to the breaker insulated housing, a wall of the conducting contact electrically connected with the breaker wire terminal, the breaker insulated housing being directly fixable on a breaker mounting member;

whereby, when the conducting strip design of one of the cradle secondary isolating contacts corresponds with a selected one of the circuit breaker positions, the conducting contact of the corresponding breaker secondary isolating contact is in electrical contact with the conducting strip.

* * * * *